United States Patent [19]

Televantos et al.

[11] Patent Number: 5,767,323
[45] Date of Patent: Jun. 16, 1998

[54] PROCESS FOR PREPARING POLYOXYALKYLENE POLYETHER POLYOLS HAVING LOW LEVELS OF TRANSITION METALS THROUGH DOUBLE METAL CYANIDE COMPLEX POLYOXYALKYLATION

[75] Inventors: Yiannakis Televantos; Bi Le-Khac, both of West Chester, Pa.

[73] Assignee: ARCO Chemical Technology, L.P., Greenville, Del.

[21] Appl. No.: 577,986

[22] Filed: Dec. 22, 1995

[51] Int. Cl.⁶ .................................................. C07C 43/11
[52] U.S. Cl. .................................... 568/613; 568/621
[58] Field of Search ............................. 568/613, 621

[56] References Cited

U.S. PATENT DOCUMENTS

| | | | |
|---|---|---|---|
| 3,393,243 | 7/1968 | Cuscurida | 260/615 |
| 3,427,256 | 2/1969 | Milgrem | 252/431 |
| 3,427,334 | 2/1969 | Herold | 260/429 |
| 3,427,335 | 2/1969 | Herold | 260/429 |
| 3,829,505 | 8/1974 | Herold | 260/611 B |
| 3,941,849 | 3/1976 | Herold | 260/607 A |
| 4,239,879 | 12/1980 | Fabris et al. | 528/76 |
| 4,282,387 | 8/1981 | Olstowski | 568/618 |
| 4,355,188 | 10/1982 | Herold et al. | 568/620 |
| 4,472,560 | 9/1984 | Kuyper et al. | 526/120 |
| 4,477,589 | 10/1984 | Van der Hulst et al. | 502/169 |
| 4,721,818 | 1/1988 | Harper et al. | 568/120 |
| 4,987,271 | 1/1991 | Watabe et al. | 568/621 |
| 5,010,047 | 4/1991 | Schuchardt | 568/618 |
| 5,010,187 | 4/1991 | Heuvelsland | 536/120 |
| 5,114,619 | 5/1992 | Heuvelsland | 252/182.27 |
| 5,158,922 | 10/1992 | Hinney et al. | 502/175 |
| 5,248,833 | 9/1993 | Hinney et al. | 568/621 |

FOREIGN PATENT DOCUMENTS

| | | |
|---|---|---|
| 4-216823 | 8/1992 | Japan . |
| 4216823 | 8/1992 | Japan . |
| 5247199 | 9/1993 | Japan . |
| 6228247 | 8/1994 | Japan . |

OTHER PUBLICATIONS

"Standard Methods of Testing Urethane Foam Polyol Raw Materials" ASTM Designation No.: D 2849–69.

*Primary Examiner*—Gary Geist
*Assistant Examiner*—Sreeni Padmanabhan
*Attorney, Agent, or Firm*—Dennis M. Kozak

[57] ABSTRACT

Substantially transition metal-free polyoxyalkylene polyethers may be prepared by double metal cyanide complex-catalyzed oxyalkylation of a suitable hydric oxyalkylation initiator molecule by employing 15 ppm or less of a double metal cyanide complex oxyalkylation catalyst having a propylene oxide polymerization rate greater than 5 g propylene oxide/minute. The induction periods associated with oxyalkylation employing double metal cyanide complex catalysts may be reduced by preparing preactivated master batches and by increasing the oxyalkylation reactor temperature during at least the induction period.

20 Claims, 1 Drawing Sheet

PROCESS FOR PREPARING POLYOXYALKYLENE POLYETHER POLYOLS HAVING LOW LEVELS OF TRANSITION METALS THROUGH DOUBLE METAL CYANIDE COMPLEX POLYOXYALKYLATION

TECHNICAL FIELD

The present invention pertains to a process for preparing polyoxyalkylene polyether polyols having exceptionally low levels of transition metal ions, by the double metal cyanide complex catalyzed polyoxyalkylation of a suitably hydric initiator in the presence of 15 parts per million (ppm) or less of a double metal cyanide complex catalyst. The resulting polyoxyalkylene polyether polyols contain commercially acceptable levels of transition metal ions without any further necessity for filtration and/or purification as has been previously practiced when these catalysts are utilized.

BACKGROUND ART

Polyoxyalkylene polyether polyols, particularly di- and higher-functionality polyols, are the mainstay of the polyurethane industry, reacting with di- and polyisocyanates to form numerous polyurethane and polyurethane/urea products, including flexible and rigid foams, microcellular elastomers, and non-cellular elastomers. Such polyoxyalkylene polyether polyols have generally heretofore been prepared by the polymerization of an alkylene oxide, generally propylene oxide and/or ethylene oxide, onto a suitably hydric initiator molecule in the presence of a basic catalyst such as sodium or potassium hydroxide, or the corresponding alkoxides.

In the presence of such basic catalysts, a competing rearrangement of propylene oxide end other higher alkylene oxides into unsaturated species such as allyl alcohol, introduces an unsaturated, monohydroxyl-functional molecule into the reaction mixture, which can then serve as a monofunctional initiator for further oxyalkylation. This phenomenon is discussed by Ceresa, Editor, BLOCK AND GRAFT POLYMERIZATION, Vol. 2, John Wiley & Sons, pp. 17-21.

When the desired polyoxyalkylation product is monofunctional, as might be used in the nonionic surfactant field, or as a reactive plasticizer or chain terminator in hydroxyl-reactive polymer systems, the functionality of the oxyalkylation product is not altered by the introduction of the monofunctional allylic species. However, the unsaturation introduced into the polyoxyalkylene polyether product mixture can cause undesirable effects in certain applications, and the broadened molecular weight distribution is often deleterious. When di- or higher-functionality polyoxyalkylene polyethers are desired, the theoretical, or "nominal," functionality of the polyoxyalkylene polyether product is dictated by the functionality of the initiator molecule(s) which, in polyurethane applications, is generally from 2 to about 8 or more. As a result of the introduction of an oxyalkylatable monohydric species, the actual functionality of the polyether polyol is undesirably lowered. As additional alkylens oxide is polymerized, the generation of monofunctional species continues, and the resulting polyoxyalkylene product may contain as much as 50 mol percent of monofunctional species or mores even at modest equivalent weights of 2000 Daltons (Da) or less. As a result, the theoretical functionality of two for a polyoxypropylene diol may be lowered to c.a. 1.6 or even lower. The introduction of the unsaturated monofunctional species creates a practical upper limit of about 2000 Da equivalent weight for polyoxypropylene polyols prepared by base catalyzed oxyalkylation.

Attempts to minimize unsaturation, and the resulting monofunctional species associated therewith, have included decreasing the amount of basic catalyst and decreasing the reaction temperature. Both these methods, however, undesirably extend processing time. Moreover, the reduction in monofunctional species is at most minimal. An a result, resort has been made to catalysts other than basic catalysts for preparing polyoxyalxylene polyether polyols.

In U.S. Pat. No. 3,393,243, for example, far more expensive cesium hydroxide and rubidium hydroxide have been proposed as basic catalysts to replace the commonly used sodium and potassium hydroxides. These catalysts, while reducing unsaturation, are far more expensive than their lighter alkali metal analogs, and still require adsorbent treatment for removal once the polyoxyalkylene product has been prepared at the desired molecular weight. Furthermore, due to the higher atomic weight of the alkali metals involved, a greater weight percentage must be used to provide the same mol percentage of catalyst.

In U.S. Pat. No. 4,282,387, the use of calcium, strontium, or barium carboxylates such as calcium naphthenate is disclosed, without subsequent residual catalyst removal. However, the products prepared by this process cannot be used for many applications where calcium naphthenates and other carboxylate species cannot be tolerated. Their use in preparing polyurethane foams and microcellular and non-cellular elastomers is proposed, as many carboxylate salts are catalysts for the urethane-promoting reaction. However, certain polyurethane systems, particularly those used to prepare polyurethane foams, are very sensitive, and the presence of even minor amounts of catalytic species other than those contemplated for the system may cause foam collapse.

In U.S. Pat. Nos. 5,010,187 and 5,114,619 are disclosed the use of higher alkaline earth metal oxides and hydroxides, for example barium and strontium oxides and hydroxides, as oxyalkylation catalysts. Unsaturation is lowered somewhat through the use of these catalysts, however, catalyst residues must still be removed via neutralization and/or adsorption. Use of catalysts containing strontium requires particular scrutiny, due to the documented toxicity of strontium.

In the decades of the 1960's and 70's, double metal cyanide complex (DXC complex) catalysts were introduced for oxypropylation. These catalysts, such as a non-stoichiometric zinc hexacyanocobaltate-glyme complex were found to be highly efficient catalysts for oxypropylation under certain conditions. Polyether polyols having much higher molecular weights than previously possible could be produced. For polyoxypropylene diols having equivalent weights of c.a. 2000 Da, levels of unsaturation in the range of 0.015 to 0.020 meq/g as compared to 0.07 to 0.09 meq/g for otherwise similar phase catalyzed polyols, were achieved. The far greater cost of these DMC complex catalysts as compared to sodium and potassium hydroxide prevented their commercialization, even though somewhat more active than traditional base catalysts. Moreover, the presence of large amounts of transition metals, particularly zinc and cobalt, in the initial polyoxyalkylene product required expensive and time-consuming methods of purification. Considerable efforts are being exerted even today to facilitate more rapid and less costly means of catalyst removal.

In the decades of the 80's and early 90's, DMC complex catalysts were produced which possessed considerably greater catalytic activity than prior catalysts. Such DPC complex catalysts, for example those described in U.S. Pat. No. 5,158,922, were able to be used at concentrations of c.a. 250 ppm to 500 ppm based on the weight of the polyol product. As a result of this higher activity, catalyst cost per so became competitive with catalyst cost for traditional base catalysis of polyoxyalkylene polyols. However, again, the expense and difficulty of removing catalyst residues from the product prohibited wide scale commercialization.

More recently, the assignee of the present; invention has developed DMC complex catalysts with far greater activity. As a result, it has become practical to lower the level of catalysts to below the previously practiced ranges of 250 ppm to 500 ppm, for example 100 ppm, while still retaining acceptable reaction rate. The catalytic activity of these new catalysts is so great that process time is generally limited only by the heat removal capacity or the polyoxyalkylation reactor, and not by the rate of polymerization per se. Due to the much lower level of catalyst required, preparation of polyoxyalkylene polyols using these double metal cyanide complex catalysts has now become commercially feasible, even though purification of the polyol product is still required to remove transition metal DMC complex residues. The purification steps still add undesirably to the process time, however.

Polyoxyalkylene polyols prepared by these Exceptionally Active "EA" double metal cyanide complex catalysts have several unusual characteristics which may be taken advantage of in compounding new polyurethane and other formulations. First, the degree of unsaturation is exceptionally low, typically measuring from 0.002 to about 0.007 meq/g, as opposed to the 0.015 to 0.018 meq/g unsaturation of polyoxyalkylene polyether polyols prepared using DMC catalysts exemplified by U.S. Pat. No. 5,158,922. Moreover, while these earlier DMC catalyzed polyether polyols, generally contain from 5–10% of a low molecular weight component, thought to be monofunctional, unsaturated species, gel permeation chromatography of polyoxyalkylene polyols prepared with EA-DMC catalysts fail to show any detectable lower molecular weight components, despite having a measurable, albeit unexpectedly low, unsaturation. Polyoxyalkylene polyether polyols prepared using these more active DMC catalysts also exhibit a very narrow molecular weight distribution. Polydispersities, $M_w/M_n$ of less than 1.30 are virtually always obtained, and the vast majority of polyoxyalkylene polyether polyols produced by third generation catalysts have polydispersities of about 1.07 to 1.15 or less. The polyoxyalkylene polyether polyols are virtually monodisperse.

The use of lower levels of DMC catalysts would, of course, be preferable. However, at very low levels of catalysts, for example in the range of 25 ppm to less than 100 ppm, several problems arise. First, catalyst deactivation is a serious concern. Several commonly encountered species such as sodium hydroxide, potassium hydroxide, and other bases are known to be effective catalyst poisons for double metal cyanide complex catalysts. While traces of such ingredients may not be important when fairly large quantities, e.g. 250–500 ppm of catalysts are used, when small amounts of catalysts are contemplated, even small amounts of catalyst poisons may result in complete inactivation of the catalyst. In some cases, even variations in reactor configuration may result in catalyst inactivation as opposed to polymerization activity. Thus, Use of catalyst levels significantly below 100 ppm has not been thought possible.

In Japanese published application H4-216823, a two-stage process is disclosed for minimizing catalyst usage in which a large concentration of catalyst, for example 300–700 ppm is used in a first oxyalkylation stage, following which additional catalyst and a much larger proportion of initiator (starter molecule) is added prior to a second oxyalkylation. Final catalyst contents of 70 ppm are achieved. However, the process requires a two-stage procedure which is both more expensive as well as time-consuming. Moreover, the final catalyst concentration is too large to be left in the polyol product, and thus catalyst removal methods must be employed. These are stated to be more rapid due to the lower catalyst level.

DMC catalysts are also characterized by an initial dormant period, wherein after addition of alkylene oxide to the reactor, polymerization is delayed for an appreciable amount of time, the so-called "induction period," during which virtually no polymerization occurs. The end of the induction period may be ascertained by a rapid drop in reactor pressure following addition of an initial quantity of alkylene oxide. Following activation of the catalyst, polymerization is quite rapid . The induction period has been found to be in inversely related to the amount of catalyst utilized, although not in a linear fashion. In some cases, long induction periods have been followed by catalyst inactivation. Still further undesirable effects of the use of exceptionally low catalyst levels are an undesirable increase in the polydispersity of the polyol product, and an accompanying increase in viscosity. In general, low viscosity products are desirable, and for many applications, essentially monodisperse polyols are desired.

It would be desirable to provide a process for the preparation of polyoxyalkylene polyether polyols wherein exceptionally low levels, e.g. 15 ppm or lose of double metal cyanide complex catalysts are utilized. It would be further desirable to provide a process wherein the amount of catalyst utilized is so small that catalysts may be retained in the polyether polyol product without resort to purification or other techniques to remove transition metals. It would further be desirable to provide a process capable of supplying polyoxyalkylene polyether polyol having exceptionally low polydispersity and low viscosity while employing low levels of double metal cyanide complex catalysts.

SUMMARY OF THE INVENTION

It has now been surprisingly discovered that polyoxyalkylane polyols of very narrow polydispersity and low viscosity may be produced even at double metal cyanide complex catalyst levels of 15 ppm or less, when double metal cyanide complex catalysts having propylene oxide polymerization rates higher than 5g propylene oxide/100 ppm catalyst measured at 105' are used as the oxyalkylation catalyst (EA-DMC catalysts). It has also been surprisingly discovered that polyols having low polydispersity and low viscosity may be produced when the polymerization reaction is carried out at a higher than normal oxyalkylation temperature. Both the polydispersity and viscosity of the polyoxyalkylene polyether products thus obtained are similar to those employing higher levels of catalysts at traditional oxyalkylation temperatures. The amounts of catalysts utilized in the process are so low so as not to require purification and yet still be below the generally acceptable standards for transition metals in the polyol product. The use of high oxyalkylation temperatures and/or the use of preinitiated initiator/alkylene oxide/catalyst master batches significantly decrease the induction period associated with double metal cyanide complex catalysts.

DESCRIPTION OF THE PREFERRED EMBODIMENTS

Figure 1:
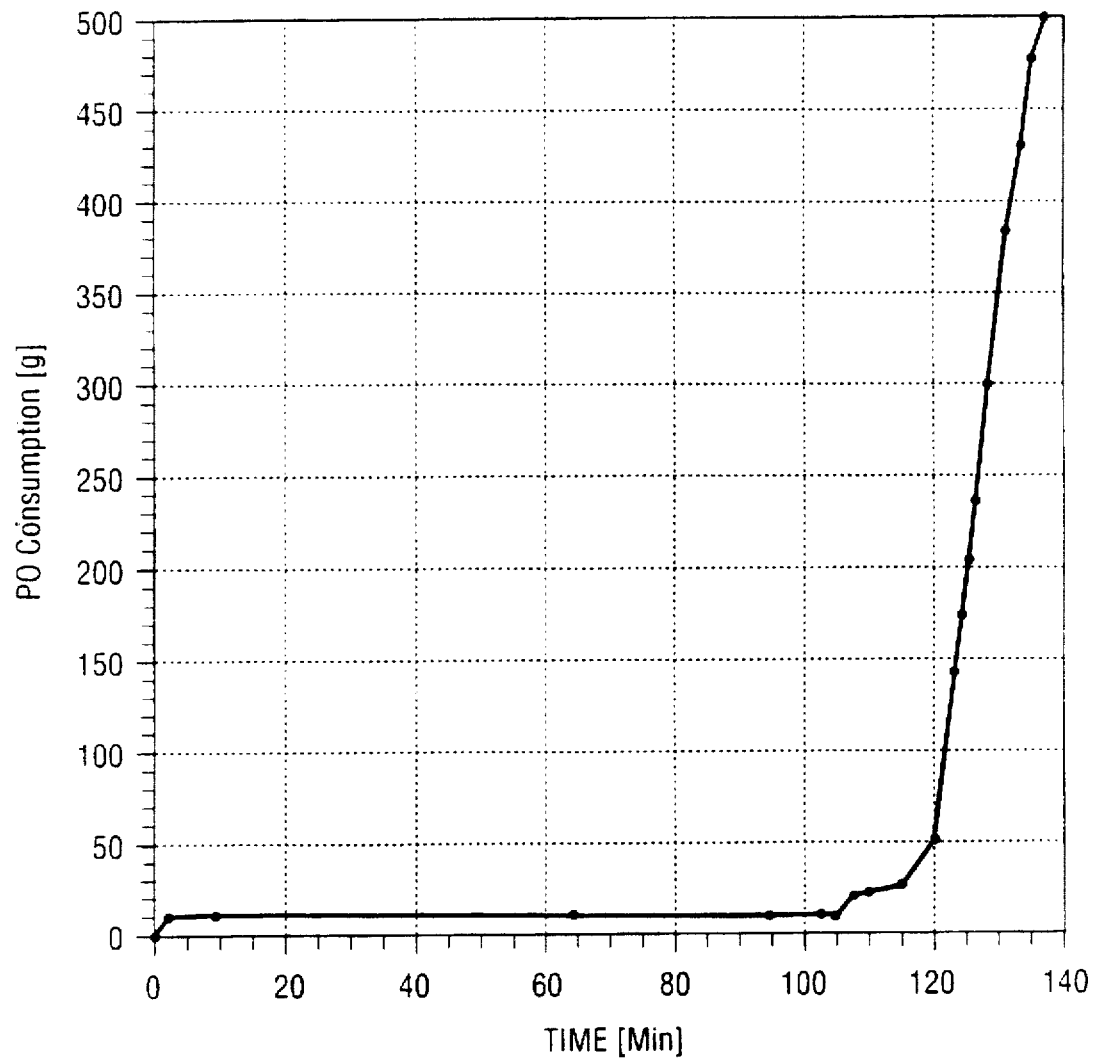
FIG. 1 is a plot of propylene oxide consumption versus time which may be used to determine the rate of propylene oxide polymerization and the induction period for double metal cyanide complex oxyalkylation.

Alkylene oxides useful in the subject invention include ethylene oxide, propylene oxide, 1,2- and 2,3-butylene oxide, in particular, propylene oxide or propylene oxide admixed with ethylene oxide. Higher alkylene oxides such as the $C_5$ to $C_{20}$ alpha alkylene oxides are also suitable, as are also styrene, oxetane, and the like. The term "higher alkylene oxide" as used hereinafter includes the butylene oxides. The above alkylene oxides may be introduced solely to form homopolymeric products, sequentially to form block polymer products, or in admixture to form random polyether products or block random polyether product.

When ethylene oxide is to be used in conjunction with another alkylene oxide, however, the ethylene oxide should not be utilized alone, otherwise products of variable character believed to contain considerable quantities of polyoxyethylene glycols may be produced. Ethylene oxide may, however, be mixed with other alkylene oxides to form random polyoxyalkylene polyether products. If polyoxyethylene-capped polyether polyols are desired, it is preferable to first prepare a base polyol containing propylene oxide or a higher alkylene oxide, optionally in admixture with ethylene oxide to form an alkylene oxide homopolymer or alkylene oxide/ethylene oxide random copolymer, followed by addition of a traditional basic or other catalyst for the purpose of capping the base polyol with oxyethylene moieties, sodium hydroxide or potassium hydroxide may be used, for example, as these catalysts deactivate the double metal cyanide catalysts and promote the uniform oxyathylation of the base polyol.

The polyoxyalkylene polyols prepared by the subject invention may also contain residues derived from copolymerizable monomers other than 1,2-alkylene oxides, and are also considered polyoxyalkylene polyether polyols within the meaning of that term as used herein. The copolymerizable monomers may, for example, introduce ester linkages into the polyoxyalkylene polyol. Preferably, residues derived from cyclic ethers, most preferably 1,2-alkylene oxides, comprise in excess of 50 mol percent of the polyoxyalkylene polyol repeating moieties. Examples of copolymerizable monomers include the various saturated and unsaturated polycarboxylic acid anhydrides such as those disclosed in U.S. Pat. No. 5,145,883 and include, but are not limited to maleic anhydride, 1,2-dimethylmalaic anhydride, succinic anhydride, phthalic anhydride, trimellitic anhydride, pyrosellitic anhydride, methylendomethylene tetrahydrophthalic anhydride, endomethylene tetrahydrophthalic anhydride, chlorendic anhydride, and the like.

Additional copolymerizable monomers include oxetane, 3,3-dimathyloxatane, 3-vinyl-3-methyloxetane, 3-chloromethylene oxetane, and various other substituted oxetanes as taught by U.S. Pat. No. 3,941,849. Further additional polymerizable monomers include lactones such as butyrolactone and E-caprolactone. Examples of suitable copolymerizable monomers and processes for preparing polyethereater and other polyoxyalkylene polyols may be found in U.S. Pat. Nos. 3,278,457; 3,404 109; 5,145,183; 5,358,043; 5,223,583; 4,472,560; 3,941,849; 3,900,518; 3,538,043; 3,404,109; 3,278,458; and 3,278,457, which are herein incorporated by reference.

For polyoxyalkylene polyols in the lower equivalent weight ranges, i.e. from 1000 Da to 2000 Da, the oxyalkylation temperatures may be selected so as to be conventional, i.e. in the range of 90°–110° C. However, for higher molecular weight polyoxyalkylene polyols, for example those having equivalent weights of greater than 2000 Da to about 6000 Da or higher, it has been is found that conventional oxyalkylation temperatures often result in a polyoxyalkylene polyether polyol product having high polydispersity and high viscosity. For double metal cyanide complex catalyzed polyoxyalkylene polyether polyols in this higher molecular weight range, it is highly preferable to conduct the oxyalkylation at higher than normal temperatures, i.e. from 1200° C. up to the catalyst deactivation temperature, more preferably from 125° C. to 150° C., and most preferably at temperatures in the range of 130° to 1500° C.

While not wishing to be bound to any particular theory, it is believed that during the preparation of higher molecular weight polyoxyalkylene polyols, the higher viscosities experienced with exceptionally low levels of double metal cyanide catalysts is due to the inefficient diffusion of the alkylene oxide(s) into the reaction mixture. By increasing the temperature of the polyoxyalkylation reactor, the viscosity of the reaction mixture is decreased, facilitating increased diffusion of alkylene oxide. Moreover, the increased temperature has also surprisingly been found effective in reducing the induction period which may otherwise be quite long with exceptionally low levels of double metal cyanide catalysts.

A further method of reducing the induction period is the use of a preactivated master batch process. In this process, one or more initiators and the desired level of catalyst are added to a suitable reaction vessel, for example a stainless steel autoclave, and following $N_2$ flushing, an initial quantity of alkylene oxide added until a pressure drop occurs, as described elsewhere herein. However, rather than add additional alkylene oxide to the activated initiator/alkylene oxide/catalyst mixture, the mixture is maintained as a master batch and introduced in suitable quantity to a different oxyalkylation reactor, which advantageously contains a further quantity of initiator(s). Oxyalkylation is then commenced, without any appreciable induction period.

For example, a master batch nay be prepared containing 1000 ppm catalyst, activated, and then 1 weight percent, representing 10 ppm catalyst, added to a reactor containing a further amount of initiator. The master batch is preferably maintained at a relatively low temperature, i.e. room temperature, and remains sealed to prevent ingress of moisture which tends to cause deactivation. The master batch reactor may be connected directly to the primary oxyalkylation reactor, for example.

The initiators useful in preparing the polyoxyalkylene polyether polyols of the subject invention include the common initiator molecules having hydroxyl functionalities of from 1 to 8 or higher, for example alkanols such as methanol, ethanol, 1-propanol, 2-propanol, 1-butanol, 2-butanol, 1-octanol, 1-decanol, 1-dodecanol, 2-ethylhexanol, ethylene glycol monomethyl ether, and the like; diols or glycols such as ethylene glycol, propylene glycol, 1,3-propanediol, 1,4-butanediol, 1,6-hexanediol, 1,8-octanediol, diethylene glycol, dipropylene glycol, 1,4-cyclohexanedimethanol, triethylene glycol, and tripropylene glycol; aliphatic triols such as glycerine, trimethylolpropane, and trimethylolethane; tetrahydric initiators such an pentaerythritol; pentahydric initiators such as the alkyl glucoides, for example α-methylglucoside; hexahydric initiators such as sorbitol, mannitol, hydroxyothylglucoside, and hydroxypropylglucoside; and octahydric initiators such as sucrose. Various higher functionality starch-based initiators or methylolated species such as the various novolak and resole resins prepared by reaction of formaldehyde and a phenolic compound such as phenol or cresol are also useful.

It has been found with prior DMC complex catalysts, that when low molecular weight initiators such as ethylene glycol, propylene glycol, glycerine, or trimethylolpropane are utilized, the induction period is exceptionally long. Therefore, it has been preferable to utilize hydroxyl-functional polyoxyalkylene oligomers prepared by the conventional oxyalkylation of one or more of the monomeric initiators discussed in the previous paragraph, to form an initiator molecule having an equivalent weight of preferably from 100 Da to 500 Da. Since the equivalent weights of these oligomeric initiators is relatively low, the base catalyzed oxyalkylation does not result in an appreciable amount of unsaturation. The oligomeric initiators may be prepared in the presence of other catalysts, as well.

It has been unexpectedly discovered, however, that when EA-DMC catalysts are utilized to prepare polyoxyalkylene polyether polyols, that lower molecular weight initiators may often be used without exceptionally long induction periods and without catalyst deactivation at low catalyst levels. For example, tripropylene glycol, an initiator molecule having an equivalent weight of only 96 Dal may be used to prepare polyoxyalkylene polyols at catalyst levels of 15 ppm or less when high activity catalysts according to the subject invention arm employed.

In general, the initiator or initiators are added to the polyoxyalkylation reactor, following which the required level of DMC catalyst is added. Th catalyst may be slurried into one or more of the initiators to form a master batch, prior to addition to the oxyalkylation reactor to more accurately measure the amount of catalyst added, or may be slurried in a volatile solvent such as N-methylpyrollidone, hexane, or the like, which is easily removed from the product during stripping of unreacted alkylene oxide at the end of the oxyalkylation reaction, or removed during the initial purging of the reactor. The reactor is generally filled with dry nitrogen, subjected to vacuum, refilled with nitrogen, and again subjected to vacuum to remove air and traces of moisture which might be present.

The alkylene oxide to be reacted is then fed into the reactor in an initial, relatively small amount, generally less than 10% of the total expected charge of alkylene oxide. Enough alkylene oxide may be added, for example, to return the pressure in the reactor to atmospheric pressure. Following this initial addition of alkylene oxide, the reactor pressure is carefully monitored. A sudden decrease in pressure in the reactor, caused by reaction of the alkylene oxide, indicates that the catalyst has been activated. Additional alkylene oxide can then be added, the rate of addition being dependent generally an the degree of heat removal possible with a particular reactor configuration. Heat transfer from the reaction is facilitated by vigorous agitation, which has also been found to assist in lowering polyol viscosity. Alkylene oxide continues to be added to the reactor until the desired molecular weight product has been obtained. During the course of the alkylene oxide addition, the alkylune oxide composition may be changed from its initial composition to a second, third, or fourth composition during the course of the oxyalkylation, provided that the alkylene oxide composition in the reactor does not change to one containing substantially all ethylene oxide, otherwise a polyol containing homopolyoxyethylene moieties may be produced.

The EA-double metal cyanide complex catalysts suitable for use in the subject invention have polymerization activities equal to or greater than those providing a reaction rate of about 5 g propylene oxide per minute at a catalyst concentration of 100 ppm, measured at 105° C. and 10 psig propylene oxide pressure. It is convenient to express catalyst activity in terms of propylene oxide polymerization as propylene oxide is the most widely used of the alkylone oxides and is readily available. The level of 100 ppm, this amount based on final product weight, is chosen to obtain a reaction rate which is sufficiently rapid under laboratory conditions to provide a ready measure of reaction rate, and also to provide a catalyst level which is less susceptible to variations in measurement of reaction rate due to impurities which might be routinely encountered. The temperature of 105° C. is chosen as it is normal temperature at which oxyalkylations are conducted. A pressure of 10 psig is used as this is a convenient pressure well within the range normally regarded as safe for propylene oxide oxyalkylation. The reactor used to measure catalyst activity should be a stainless steel or other essentially passive metal autoclave or one having an inert lining of, e.g. glass, ceramic, Teflone, or the like. The autoclave and its associated connecting lines, entry ports, sealing gaskets, stirring devices, etc., should be thoroughly cleaned by customary procedures prior to measurement of catalyst activity.

Catalyst activity is measured by oxypropylation of 70 g of a 700 Da number average molecular weight, glycerine initiated polyoxypropylene triol at 105' with an amount of catalyst sufficient to provide 100 ppm catalyst in the polyol product, assuming the product polyol to have a molecular weight of 6000 Da. A more detailed description of catalyst activity measurement is presented in Example 7 herein.

The catalyst activity is the rate of propylene oxide polymerization in grams of propylene oxide per minute as determined by the maximum slope of a plot of grams of propylene oxide resumed (g PO) versus time over the essentially linear portion of the plot following the induction period, i.e. the maximum slope, or d(gPO)/dt. An example of a plot is given in FIG. 1, where the activity of the catalyst to which the plot corresponds to approximately 28 g PO/min. The catalyst activity must be minimally 5 g PO/min. is preferably 10 g PO/min or more, and is preferably 20 g PO/min or higher.

The catalysts of the subject invention are preferably thermally stable catalysts. By "thermally stable" catalyst is meant a catalyst which retains sufficient catalytic activity at temperatures higher than 120° C. at catalyst concentrations below about 15 ppm relative to the weight of the finished polyoxyalkylene polyether product such that a 2000 Da equivalent weight polyoxyalkylene polyether product may be obtained before the catalyst activity falls to 50% or more of the catalytic activity measured following the induction period. The activity may be measured by determining the instantaneous weight of propylene oxide or other alkylene oxide being fed to the reactor at constant pressure. The temperature at which the catalyst ceases to be thermally stable is at least 120° C., preferably at least 125° C., more preferably at least 130° C., yet more preferably 145° C., and lost preferably at least 150°–160° C.

The amounts of EA-DMC catalyst useful herein may range from less than 1 ppm to about 15 ppm based on the weight of the polyol product, preferably 5 ppm to 15 ppm, and most preferably about 5 ppm to 10 ppm. At concentrations of 15 ppm or lose, the resulting polyol product is "substantially transition metal free," in other words contains less than about 3.5 ppm Zn and 1.6 ppm Co, respectively, for a total transition metal content of about 5 ppm. "Substantially transition metal free" indicates that the total of all transition metals derived from the double metal cyanide complex catalyst is below about 8 ppm, preferably below about 5 ppm, and most preferably below about 3 ppm.

Double metal cyanide compounds useful in the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), No(IV), Mo(VI), Al(III), V(V), V(IV), Sr(II), W(IV), W(VI), Cu(II), and Cr(III). More preferably, X is selected from the group consisting of Zn(II), Fe(II), co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 6 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel(II) nitrate, and the like, and mixtures thereof.

The water-soluble metal cyanide salts used to make the double metal cyanide compounds useful in the invention preferably have the general formula $(Y)_a M^1(CN)_b(A)_c$ in which $M^1$ is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, $M^1$ is selected from the group consisting of Co(II), Co(III), Fe(II), Fe(III), Cr(III), Ir(III), and Ni(II). The water-soluble metal cyanide salt can contain on or more of theme metals, in the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and a balances the charge of $M^1$. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and the like.

Examples of double metal cyanide compounds that can be used in the invention include, for example, zinc hexacyanocobaltate(III), zinc hexacyanoferrate(III) and the like. Further examples of suitable double metal cyanide compounds are listed in U.S. Pat. No. 5,158,922, the teachings of which are incorporated herein by reference.

The solid DMC catalysts of the invention include an organic complexing agent. Generally, the complexing agent must be relatively soluble in water. Suitable complexing agents are those commonly known in the art, as taught, for example, in U.S. Pat. No. 5,158,922. The complexing agent is added either during preparation or immediately following precipitation of the catalyst, preferably dissolved in the same solution(s) as either or both of the metal salts used to form the double metal cyanide. Usually, an excess amount of the complexing agent in used. Preferred complexing agents are water-soluble hgteroatom-containing organic compounds that can complex with the double metal cyanide coapound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol (t-butanol) is most preferred. These complexing agents may be termed "organic complexing agents."

The solid DMC catalysts of the invention preferably include from about 5 to about 80 wt. % of a polyether polyol. Some or all of the hydroxyl groups of the polyether polyol may be tertiary hydroxyl groups. Preferred catalysts include from about 10 to about 70 wt. % of the polyether polyol; most preferred catalysts include from about 15 to about 60 wt. % of the polyether polyol. At least about 5 wt. % of the polyether polyol is needed to significantly improve the catalyst activity compared with a catalyst made in the absence of the polyether polyol. Catalysts that contain more than about 80 wt. % of the polyether polyol are generally no more active, and they are impractical to isolate and use because they are typically sticky pastes rather than powdery solids. Polyether polyols suitable for use in making the catalysts of the invention preferably have at least some tertiary hydroxyl groups. Preferred polyether polyols have at least 5 mol percent tertiary hydroxyl groups; more preferred are polyols that have at least about 20 mol percent tertiary hydroxyl groups. Such groups may be introduced by terminating the oxyalkylation with isobutylene oxide or mixtures of alkylene oxides containing isobutylene oxide during preparation of the polyol.

The polyols used in the catalysts can be made by any suitable method. Polyether polyols made by ring-opening polymerization of cyclic others (epoxides, octanes, tetrahydrofuran) can be used. The polyols can be made by any method of catalysts (acid, base, coordination catalyst). Tertiary hydroxyl groups are conveniently introduced by including a cyclic ether monomer that is fully substituted at the α-carbon atom of the cyclic ether. Cyclic ethers useful for introducing tertiary hydroxyl groups include, for example, isobutylene oxide, 1,1,2-trimethylethylene oxide, 1,1,2,2,-tatramethylethylene oxide, and the like. For example, one polyether polyol suitable for use in making the catalysts of the invention is prepared by making a polyoxypropylene polyol using double metal cyanide catalysts, and then adding isobutylene oxide to cap the polyol and convert some or most of the terminal hydroxyl groups from primary or secondary hydroxyl groups to tertiary hydroxyl groups.

Suitable polyether polyols include those in which tertiary hydroxyl group content is introduced by including a lactone monomer in which the carbon α-to the lactone oxygen is fully substituted. Thus, for example, a suitable polyol for use in the invention is made by reacting a polyoxypropylene polyol with ε, ε-dimethyl-ε-caprolactone to cap the polyol and give a product in which at least some of the terminal hydroxyl groups are tertiary hydroxyl groups.

Preferred polyether polyols for making the catalysts have average hydroxyl functionalities from about 2 to 8, and number average molecular weights within the range of about 200 to about 10,000, more preferably from about 500 to about 5000. Most preferred are polyether diols and triols having number average molecular weights from about 1000 to about 4000. Particularly preferred polyether polyols are polyoxypropylene diols and triols capped with from about 1 to 5 isobutylene oxide units. These polyols preferably have at least about 20% of tertiary hydroxyl groups.

When the catalyst contains a polyether polyol, both an organic complexing agent and the polyether polyol are required as complexing agents in the double metal cyanide complex catalyst. Including the polyether polyol in addition to the organic complexing agent enhances activity of the catalyst compared with the activity of a similar catalyst prepared in the absence of the polyether polyol. However, the organic complexing agent is also needed: a catalyst made in the presence of the polyether polyol, but without an organic complexing agent will not polymerize epoxides.

It was surprisingly found that the use of polyether polyol having tertiary hydroxyl groups further improves the catalyst compared with catalysts made with an organic complexing agent and a polyether polyol that does not have tertiary hydroxyl groups. These catalysts have exceptionally high activity for polymerizing epoxides, and they can be used to make polyols having very low unsaturations even at relatively high epoxide polymerization temperatures.

The method of preparing EA-DMC catalysts useful in the subject invention comprises preparing a solid DMC catalyst in the presence of an organic complexing agent and preferably also in the presence of a polyether polyol that most preferably contains tertiary hydroxyl groups. Aqueous solutions of a metal salt (excess) and a metal cyanide salt are reacted by adding the metal salt and metal cyanide salt under high shear conditions, i.e. in a homogenizer, and/or in the presence of the organic complexing agent and the polyether polyol when the latter is used. The polyether polyol is preferably used in an amount sufficient to produce a solid DMC catalyst that contains from about 5 to about 80 wt. % of the polyether polyol.

In a typical method, aqueous solutions of a metal salt (such as zinc chloride) and a metal cyanide salt (such as potassium hexacyanocobaltate) are first reacted in the presence of an organic complexing agent (such as t-butanol) using efficient mixing to produce a catalyst slurry. The mixing is preferably high shear mixing using mixing devices such as homogenizers. The metal salt is used in excess. The catalyst slurry contains the reaction product of the metal salt and metal cyanide salt, which is the double metal cyanide compound. Also present are excess metal salt, water, and organic complexing agent; each is incorporated to some extent in the catalyst structure.

The organic complexing agent can be included with either or both of the aqueous salt solutions, or it can be added to the catalyst slurry immediately following preparation of the DMC compound. It is generally preferred to premix the complexing agent with either aqueous solution, or both, before the combining the reactants. If the complexing agent is added to the catalyst precipitate instead, then the reaction mixture should be mixed efficiently with a homogenizer or a high-shear stirrer to produce the most active form of the catalyst. The mixing of the metal salt and metal cyanide salt solutions preferably takes place at modestly elevated temperature, for example 40°–50° C.

The catalyst slurry produced as described above may be combined with the polyether polyol, preferably one having tertiary hydroxyl groups. This is preferably done using low-shear mixing to avoid thickening or coagulation of the reaction mixture. The polyether-containing catalyst is then usually isolated from the catalyst slurry by any convenient means, such as filtration, centrifugation, decanting, or the like.

The isolated solid catalyst is preferably washed with an aqueous solution that contains additional organic complexing agent. Washing is generally accomplished by reassuring the catalyst in the aqueous solution of organic complexing agent, followed by a catalyst isolation step. The washing step removes impurities that can render the catalyst inactive if they are not removed. Preferably, the amount of organic complexing agent used in this aqueous solution is within the range of about 40 wt. % to about 70 wt. %. It is also preferred to include some polyether polyol in the aqueous solution of organic complexing agent. The amount of polyether polyol in the wash solution is preferably within the range of about 0.5 to about 8 wt. %.

While a single washing step suffices, it is generally preferred to wash the catalyst more than once. The subsequent wash can be a repeat of the first wash. Preferably, the subsequent wash is non-aqueous, i.e. it includes only the organic complexing agent or a mixture of the organic complexing agent and polyether polyol. After the catalyst has been washed, it is usually preferred to dry it under vacuum until the catalyst reaches a constant weight.

While the preferred products of the process of the subject invention are polyether polyols prepared by oxyalkylating a suitably hydric oxyalkylatable initiator, other monomers that will copolymerize with an epoxide in the presence of a DMC compound can be included in the process of the invention to make other types of epoxide polymers. Any of the copolymers known in the art made using conventional DMC catalysts can be made with the process of the invention. For example, epoxides copolymerize with oxetanes as taught in U.S. Pat. Nos. 3,278,457 and 3,404,109 to give polyethers, or with anhydrides as taught in U.S. Pat. Nos. 5,145,883 and 3,538,043 to give polyester or polyetherester polyols. The preparation of polyether, polyester, and polyetherester polyols using double metal cyanide catalysts is fully described, for example, in U.S. Pat. Nos. 5,223,583, 5,145,883, 4,472, 560, 3,941,849, 3,900,518, 3,538,043, 3,404,109, 3,278,458, and 3,278,457. The teachings of these U.S. patents related to polyol synthesis using DMC catalysts are incorporated herein by reference in their entirety.

Polyether polyols made with the catalysts of the invention preferably have average hydroxyl functionalities from about 2 to 8, more preferably from about 2 to 6, and most preferably from about 2 to 3. The polyols preferably have number average molecular weights within the range of about 500 Da to about 50,000 Da. A more preferred range is from about 1,000 Da to about 12,000 Da; most preferred is the range from about 1,000 Da to about 8,000 Da. Equivalent weights may range from 250 Da to 25,000 Da or higher, preferably 1000 Da to 6000 Da.

The following examples merely illustrate the invention. Those skilled in the art will recognise many variations that are within the spirit of the invention and scope of the claims.

EXAMPLE 1

Preparation of A solid EA-DMC Catalyst Containing t-Butanol and an Isobutylene Oxide-Capper 4 k mol. wt. Polyoxypropylene Diol as Complexing Agents Potassium hexacyanocobaltate (8.0 g) is dissolved in deionized (DI) water (140 mL) in a beaker (Solution 1). Zinc chloride (25 g) is dissolved in DI water (40 mL) in a second beaker (Solution 2). A third beaker contains Solution 3: a mixture of DI water (200 mL), t-butanol (2 mL, organic complexing agent), and Polyol W (8 g). Polyol W is made by preparing a 4000 mol. wt. polyoxypropylene diol using double metal cyanide catalysts, and then endcapping it with from 1 to 5 equivalents per hydroxyl group of isobutylene oxide using the same DMC catalyst.

Solutions 1 and 2 are mixed together using a homogenizer. Immediately a 50/50 (by volume) mixture of t-butanol and DI water (200 mL total) is added to the zinc hexacyanocobaltate mixture , and the product is homogenized for 10 min.

Solution 3 (the polyol/water/t-butanol mixture) is added to the aqueous slurry of zinc hexacyanocobaltate, and the product is stirred magnetically for 2 min. The mixture is filtered under pressure through a 5-μm filter to isolate the solids.

The solid cake is reslurried in t-butanol (140 mL) and DI water (60 mL), and the mixture is homogenized for 10 min.. A solution of DI water (200 mL) and additional Polyol 1 (2g) is added, and the mixture is stirred magnetically for 2 min. and filtered dis described above.

The solid cake is reslurried in t-butanol (200 mL) and is homogenized for 10 min. Polyol W (1 g) is added, and the mixture is stirred magnetically for 2 min. and filtered. The resulting solid catalyst is dried under vacuum at 50° C. (30 in. Hg.) to constant weight. The yield of dry, powdery catalyst is about 10 g.

Elemental, thermogravimetric, and mass spectral analyses of the solid catalyst show: polyol=18.0 wt. %; t-butanol=9.0 wt. %; cobalt=9.5 wt. %; zinc=20.1 wt. %.

A similar procedure is used to make additional catalysts that contain 23 and 50 wt. % of Polyol W, respectively.

EXAMPLE 2

Solution 1 is prepared by dissolving zinc chloride (75 g) in t-butanol (50 mL) and distilled water (275 ML). Solution 2 is prepared by dissolving potassium hexacyanocobaltate (7.5 g) in distilled water (100 mL). Solution 3 is prepared by mixing t-butanal (2 mL) and distilled water (200 mL).

Solution 2 is added to solution 1 over 30 minutes with homogenization. Mixing by homogenization continues for an additional 10 minutes. A stir bar is added. Solution 3 is added, and the mixture is slowly stirred magnetically for 3 minutes. The mixture is filtered under pressure at 40 psig. The filter cake is reslurried in t-butanol (130 mL) and distilled water (55 mL), and the mixture is homogenized for 10 minutes. The mixture is filtered as described before. The cake is reslurried in neat t-butanol (185 mL), and is homogenized for 10 minutes. The mixture if filtered, and the cake dried under vacuum at 60° C. Yield: 8.6. The catalyst is used to polymerize propylene oxide as described in Example 7. The rate of polymerization at 105° C. and 10 psig at 100 ppm catalyst is 26.3 g PO/min.

EXAMPLE 3

Preparation of Zinc Hexacyanocobaltate Catalysts by Homogenization Using t-butanol and Polyether Polyol as Complexing Agents Catalyst Preparation.

Potassium hexacyanocobaltate (8. 0 g) is dissolved in deionized (DI) water (140 mL) in a beaker (Solution 1). Zinc chloride (25 g) is dissolved in DI water (40 mL) in a second beaker (Solution 2). A third beaker contains Solution 3: a mixture of DI water (200 mL), a t-butanol (2 mL)), and polyol (2 g of a 4000 mol. wt. polyoxypropylene diol prepared via double metal cyanide catalysts.

Solutions 1 and 2 are mixed together using a homogenizer. Immediately, a 50/50 (by volume) mixture of t-butanol and DI water (200 mL total) is added to the zinc hexacyanocobaltate mixture, and the product is homogenized for 10 min.

Solution 3 (the polyol/water/t-butanol mixture) is added to the aqueous slurry of zinc hexacyanocobaltate, and the product is stirred magnetically for 3 min. The mixture is filtered under pressure through a 5-μm filter to isolate the solids.

The solid cake is reslurried in t-butanol (140 mL), DI water (60 mL), and additional 4000 mol. wt. polyoxypropylene diol (2.0 g), and the mixture is homogenized for 10 min. and filtered as described above.

The solid cake is reslurried in t-butanol (200 mL) and additional 4000 mol. wt. polyoxypropylene diol (1.0 g), homogenized for 10 min., and filtered. The resulting solid catalyst is dried under vacuum at 50° C. (30 in. Hg) to constant weight. The yield of dry, powdery catalyst is 10.7 g.

Elmental, thermogravimeteric, and mass spectral analyses of the solid catalyst show: polyol=21.5 wt. %; t-butanol=7.0 wt. %; cobalt=11.5 wt. %.

EXAMPLE 4

Preparation of Zinc Hexacyanocobaltate Catalysts Using t-butanol and Polyether Polyol as Complexing Agents Catalyst Preparation.

A one-gallon stirred glass pressure reactor is charged with a solution of potassium hexacyanocobaltate (40 g) in DI water (700 mL) (Solution 1). Zinc chloride 9125 g) is dissolved in a beaker with DI water (200 mL) Solution 2). t-Butanol (500 mL) in dissolved in a beaker with DI water (500 mL) (Solution 3). A fourth mixture (Solution 4) is prepared by suspending a 4000 mol. wt. polyoxypropylene diol (60 g, same as is used in sample 3) in DI water (1000 mL) and t-butanol (10 mL).

Solutions 1 and 2 are combined with stirring at 300 rpm followed immediately by slow addition of Solution 3 to the resulting zinc hexacyanocobaltate mixture. The stirring rate is increased to 900 rpm, and 25 the mixture is stirred for 2 h at room temperature. The stirring rate is reduced to 300 rpm, and Solution 4 is added. The product is 5 mixed for 5 min., and is filtered under pressure as described in Example 1 to isolate the solid catalyst.

The solids are reulurried in t-butanol (700 mL) and DI water (300 mL), and stirred at 900 rpm for 2 h. The stirring rate is reduced to 300 rpm, and 60 g of the 4000 mol. wt. polyoxypropylene diol in added. The mixture in stirred for 5 min., and is filtered as described above.

The solids are reslurried in t-butanol (1000 mL) and stirred at 900 rpm for 2 h. The stirring rate is reduced to 300 rpm, and 30 g of the 4000 mol. wt. polyoxypropylene diol is added. The mixture is stirred for 5 min., and is filtered as described above. The resulting solid catalyst is dried under vacuum at 50° C. (30 in. Hg) to constant weight. The catalyst is easily crushed to a fine, dry powder.

Elemental, thermogravimetric, and mass spectral analyses of the solid catalyst show: polyol=45.8 wt. %; t-butanol=7.4 wt. %; cobalt=6.9 wt. %.

EXAMPLE 5

Catalyst Preparation.

The procedure of Example 4 is followed, except that the 4000 mol. wt. polyoxypropylene diol is replaced with a 2000 mol. wt. polyoxypropylene diol also made using double metal cyanide catalysts.

Elemental, thermogravimetric, and mass spectral analyses of the solid catalyst show: polyol=26.5 wt. %; t-butanol=3.2 wt. %; cobalt=11.0 wt. %.

EXAMPLE 6

Solution 1 is prepared by dissolving potassium hexacyanocobaltate (7.5 g) in distilled water (300 mL) and t-butanol (50 mL). Solution 2 is prepared by dissolving zinc chloride (75 g) in distilled water (75 mL). Solution 3 is prepared from t-butanol (2 mL) and distilled water (200 mL).

Solution 2 is added to solution 1 over 30 minutes with homogenization. Mixing by homogenization continues for an additional 10 minutes. A stir bar is added. Solution 3 is added, and the mixture is slowly stirred magnetically for 3 minutes. The mixture is filtered under pressure at 40 psig.

The catalyst is isolated, washed, and dried as described in Example 2. The catalyst is used to polymerize propylene oxide as described in Example 7. The rate of polymerization at 105° C. and 10 psig at 100 ppm catalyst is 15.6 g Po/min.

COMPARATIVE EXAMPLE 1

Preparation of Low Activity Zinc Hexacyanocobaltate Catalysts

Potassium hexacyanocobaltate (8.0 g) is added to deionized water (150 mL) in a beaker, and the mixture is blended with a homogenizer until the solids dissolve. In a second beaker, zinc chloride (20 g) is dissolved in deionized water (30 mL). The aqueous zinc chloride solution is combined with the solution of the cobalt salt using a homogenizer to intimately mix the solutions. Immediately after combining the solutions, a mixture of t-butanol (100 mL) and deionized water (100 mL) is added slowly to the suspension of zinc hexacyanocobaltate, and the mixture is homogenized for 10 minutes. The solids are isolated by centrifugation, and are then nomogenized for 10 minutes with 250 mL of a 70/30 (v:v) mixture of t-butanol and deionized water. The solids are again isolated by centrifugation, and are finally homogenized for 10 min with 250 mL of t-butanol. The catalyst ia isolated by centrifugation, and is dried in a vacuum oven at 50° C. and 30 in. (Hg) to constant weight. The catalyst activity is 3.84 g PO/min.

EXAMPLE 7

Epoxide Polmerizations:

Rate Experiments—General Procedure

A one-liter stirred reactor is charged with polyoxypropylene triol (700 mol. wt.) starter (70 g) and double metal cyanide complex catalyst (0.057 g, 100 ppn level in finished polyol). The mixture is stirred and heated to 105° C., and is stripped under vacuum to remove traces of water from the triol starter. The reactor pressure is adjusted to a vacuum of about 30 in. (Hg), and propylene oxide (10–11 g) is added in one portion. The reactor pressure is then monitored carefully. Additional propylene oxide is not added until an accelerated pressure drop occurs in the reactor; the pressure drop is evidence that the catalyst has become activated. When catalyst activation in verified, the remaining propylene oxide (490 g) is added gradually to keep the reactor pressure at about 10 psig. After propylene oxide addition is complete, the mixture is held at 105° C. until a constant pressure is observed. Residual unreacted monomer is then stripped under vacuum from the polyol product, and the polyol is cooled and recovered.

To determine reaction rate, a plot of PO consumption (g) vs. reaction time (min) in prepared (see FIG. 1). The slope of the curve at its steepest point is measured to find the reaction rate in grams of PO converted per minute. The intersection of this line and a horizontal line extended from the baseline of the curve is taken as the induction time (in minutes) required for the catalyst to beome active. Measured reaction rates are summarized in Table 1.

TABLE 1

| Catalyst | Catalyst Activity Propylene Oxide Polymerization Rate (g PO/min) |
|---|---|
| Example 1 | 22.7 |
| Example 2 | 26.3 |
| Example 3 | 20.8 |

TABLE 1-continued

| Catalyst | Catalyst Activity Propylene Oxide Polymerization Rate (g PO/min) |
|---|---|
| Example 4 | 26.3 |
| Example 5 | 14.6 |
| Example 6 | 15.6 |
| Comparative Example 1 | 3.84 |
| Comparative Example 2[1] | 1.46 |
| Comparative Example 3[2] | 2.29 |

[1] A non-EA-DMC complex catalyst using glyme as the complexing agent and prepared as described in U.S. Pat. No. 5.158,922.
[2] A non-EA catalyst prepared substantially as described in U.S. Pat. No. 5,158,922 but using t-butanol as the complexing agent.

When this procedure is used to measure propylene oxide polymerization rates, the catalysts useful in the process of the invention polymerize PO at rates in excess of about 5 g PO/min, preferably 10 g PO/min at 100 ppm catalyst at 105° C. (see FIG. 1), or greater. The epoxide polymerization rates for catalysts of which include a polyether polyol havinag tertiary hydroxyl groups are also consistently higher than similar catalysts prepared in thu presence of polyether polyols without tertiary hydroxyl groups.

EXAMPLE 8

Polyether Polyol Synthesis:

8000 Mol. Wt. Polyoxypropylene Diol (8K-D)

A one-liter stirred reactor is charged with polyoxypropylene diol (1000 mol. wt.) starter (77 g) and a zinc hexacyanocobaltate catalyst containing 23% isobutylene oxide capped 4K diol prepared as in Example 1 (0.009 g, 10 ppm). The mixture is stirred and heated to 105° C., and is stripped under vacuum for 0.5 h to remove traces of water from the diol starter. After stripping, the reaction temperature in raised to 145° C. Propylene oxide (12 g) is fed to the reactor, initially under a vacuum of about 30 in. Hg, and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (512 g) is added gradually over about 4 h. After propylene oxide addition is complete, the mixture is held at 145° C. until a constant pressure is observed. Residual unreacted monomer is then stripped under vacuum at 60° C. from the polyol product. The product polyol has an unsaturation of 0.007 meq unsaturation/g polyol and a polydispersity of 1.15.

The same reactor as in Example 8 is charged with polyoxypropylene dial (725 mol. wt.) starter (65 g) and a zinc hexacyanocobaltate complex catalyst with glyme an complexing agent (Comparative Example 2; 0.0166 g, 25 ppm) to prepare an 8000 mol wt. polyoxypropylene diol. The mixture is stirred and heated to 105° C., and is stripped under vacuum for 0.5 h to remove traces of water from the diol starter. After stripping, the reactor temperature is raised to 130° C. Propylene oxide (11 g) is fed to the reactor, initially under a vacuum of about 30 in. Hg, and the reactor pressure is monitored carefully. When catalyst activation is verified as described in the Example 8, propylene oxide is added at the rate of 2.4 g/minute. When the PO addition reached 325 g, catalyst deactivation is observed by PO pressure build-up in the reactor. At this point, PO feed is discontinued because of high pressure in the reactor. The mixture is hold at 130° C. until a constant pressure is observed. Residual unreacted monomer is then stripped undervacuum at 80° C. from the polyol product. The product polyol has a molecular weight of about 4400 Da, an unsaturation of 0.031 meq/g and a polydispersity of 1.46. The polyol product contains 3.9 and 10 ppm of Co and Zn, respectively.

comparative Example 4 illustrates that prior art catalysts of low activity, even at the much higher level of 25 ppm, are not suitable for preparing high molecular weight polyoxyalkylene polyols with low levels of unsaturation and low polydispersity at low catalyst levels. The prior art catalyst became deactivated after a molecular weight of only 4400 Da had been reached, even at this molecular weight, the polydispersity was very high at 1.46, and the unuaturation very high, approaching the range achieved by conventional base catalysts. The residual catalyst levels are above specification without resort to catalyst residue removal methods.

The preceding examples are meant only as illustrations. The scope of the invention is defined by the claims.

What is claimed is:

1. A process for the preparation of a substantially transition metal-free hydroxyl-functional polyoxyalkylene polyether by double metal cyanide complex-catalyzed oxyalkylation of monohydric or polyhydric oxyalkylatable initiator molecule(s), comprising:

oxyalkylating said initiator molecule(s) with one or more alkylene oxides in the presence of a double metal cyanide complex oxyalkylation catalyst having an alkylene oxide polymerization rate measured with respect to oxypropylation with propylene oxide greater or equal to about 5 g propylone oxide/min at conditions of 105° C., 0.68 bar propylene oxide pressure and 100 ppm catalyst based on the weight of the polyoxypropylene polyether product, wherein the concentration of said double metal cyanide catalyst during said oxyalkylating is less than or equal to about 15 ppm based on the weight of said hydroxyl-functional polyoxyalkylene polyether; and recovering a substantially transition metal-free, hydroxyl-functional polyoxyalkylene polyether product.

2. The process of claim 1 wherein said hydroxyl-functional polyoxyalkylene polyether product is not treated to remove double metal cyanide complex catalyst residues prior to recovery.

3. The proceed of claim 1 wherein the concentration of said double metal cyanide complex catalyst during said oxyalkylating is less than or equal to 10 ppm.

4. The process of claim 1 wherein said double metal cyanide complex catalyst oxypropylation rate is greater or equal to 10 g propylene oxide/minute.

5. The process of claim 2 wherein said double metal cyanide complex catalyst oxypropylation rate is greater or equal to 10 g propylene oxide/minute.

6. The process of claim 3 wherein said double metal cyanide complex catalyst oxypropylation rate is greater or equal to 10 g propylene oxide/minute.

7. The process of claim 3 wherein said double metal cyanide complex catalyst oxypropylation rate is greater or equal to 20 g propylene oxide/minute.

8. The process of claim 2 wherein said double metal cyanide complex catalyst oxypropylation rate is greater or equal to 20 g propylene oxide/minute.

9. The process of claim 3 wherein said double metal cyanide complex catalyst oxypropylation rate is greater or equal to 20 g propylene oxide/minute.

10. The process of claim 3 wherein said one or more alkylene oxides are selected from the group consisting of a) propylene oxide, b) 1,2-butylene oxide, c) 2,3-butylene oxide, d) isobutylone oxide, mixtures of one or more of a) through d); and mixtures of one or more of a) through d) further containing ethylene oxide.

11. The process of claim 1 wherein said double metal cyanide complex catalyst is a thermally stable double metal cyanide complex catalyst.

12. The process of claim 11 wherein said oxyalkylating is performed at a temperature in excess of 120° C.

13. The process of claim 11 wherein said oxyalkylating is performed at a temperature in excess of 135° C.

14. The process of claim 12 wherein said hydroxyl-functional polyoxyalkylene polyether has an equivalent weight greater than about 2000 Da and a polydispersity of about 1.25 or less.

15. The process of claim 13 wherein said hydroxyl-functional polyoxyalkylene polyether has an equivalent weight greater than about 2000 Da and a polydispersity of about 1.25 or less.

16. A proces for preparing a hydroxyl-functional polyoxyalkylene polyether by double metal cyanide complex-catalyzed oxyalkylation of monohydric or polyhydric oxyalkylatable initiator molecule(s) with a minimal induction period, comprising:

a) preparing an preactivated initiator/double metal catalyst master batch by:
  a)i) preparing a mixture of initiator molecule(s) and double metal cyanide complex oxyalkylation catalyst;
  a)ii) adding to said mixture a quantity of one or more alkylene oxides to establish an alkylene oxide partial pressure above said mixture;
  a)iii) obtaining an activated initiator/double metal cyanide complex catalyst master batch following a reduction of said alkylene oxide partial pressure;

b) adding at least a portion of said preactivated master batch to an oxyalkylation reactor; and c) further oxyalkylating said initiator molecule(s) with one or more alkylene oxides.

17. A method for minimizing the induction period associated with the double metal cyanide complex-catalyzed oxyalkylation of monohydric or polyhydric initiator molecules to form a hydroxyl-functional polyoxyalkylene polyether product, comprising:

a) adding to a mixture containing one or more initiator molecule(s) a thermally stable double metal cyanide complex catalyst in an amount of less than or equal to 100 ppm based on the weight of said polyoxyalkylene polyether product to form an initiator/catalyst mixture;

b) adding a quantity of alkylene oxide to said initiator/catalyst mixture to form an initiator/catalyst/alkylene oxide mixture;

a) heating said initiator/catalyst/alkylene oxide mixture to a temperature above 125° C. until a pressure drop signifying catalyst activation has occurred;

d) oxyalkylating with additional alkylene oxide at a temperature of from about 70° C. to the catalyst inactivation temperature; and e) recovering a hydroxyl-functional polyoxyalkylene polyether product.

18. A hydroxyl-functional polyoxyalkylene polyether polyol prepared by the oxyalkylation of one or more hydroxyl-functional initiator molecules in the presence of less than about 15 ppm based on the weight of the polyol of a double metal cyanide complex catalyst, said polyol having a number average equivalent weight of between about 2000 Da and 10,000 Da and a polydispersity $M_w/M_n$ of less than about 1.25.

19. The polyol of claim 18 wherein said polydispersity is less than about 1.20.

20. An untreated polyoxyalkylene polyether polyol prepared by the process of claim 1.

* * * * *